May 18, 1948.  R. A. IRWIN  2,441,703
HYDRAULIC TRANSMISSION MECHANISM FOR VEHICLE DRIVE AXLES
Filed March 23, 1944  3 Sheets-Sheet 1
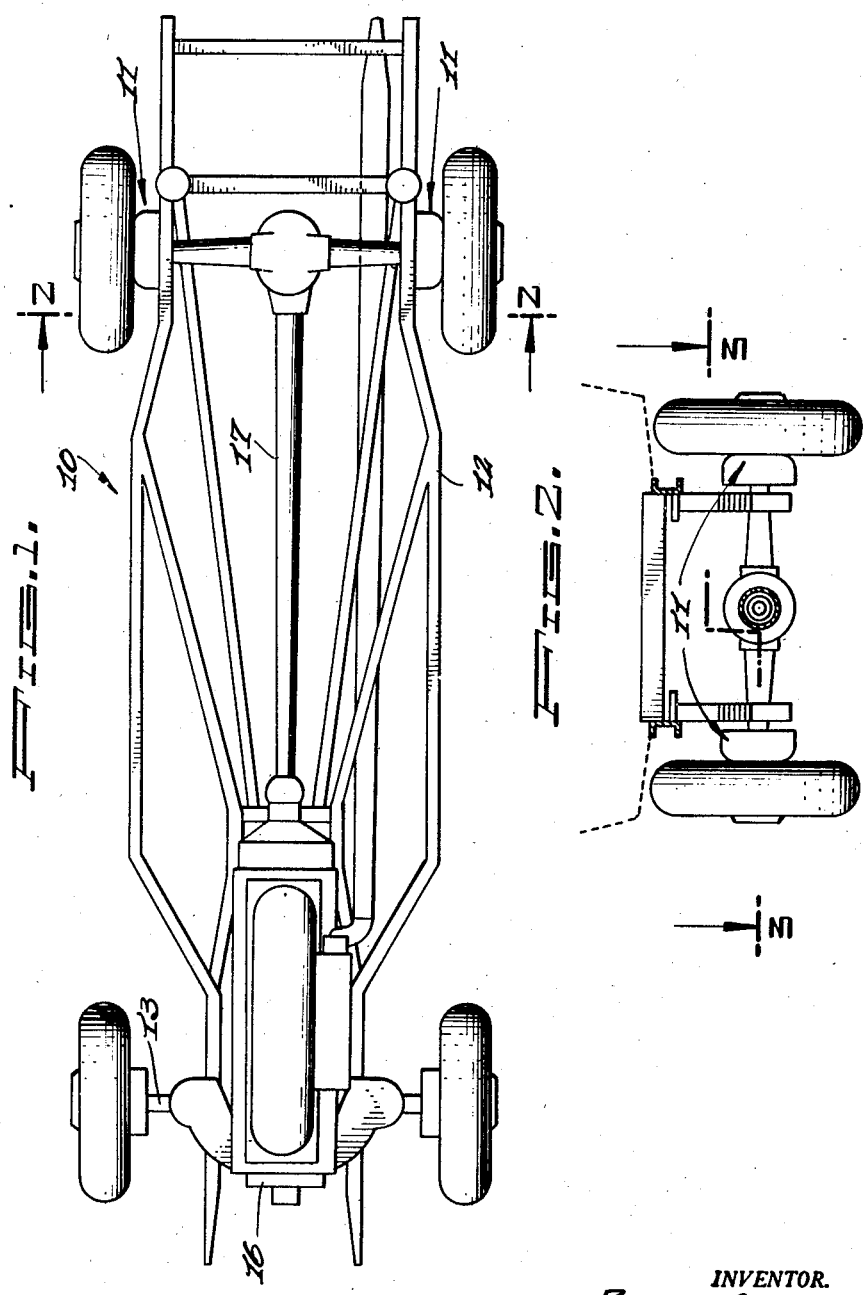
INVENTOR.
ROBERT A. IRWIN.
BY
Carl Miller
ATTORNEY.

May 18, 1948. R. A. IRWIN 2,441,703
HYDRAULIC TRANSMISSION MECHANISM FOR VEHICLE DRIVE AXLES
Filed March 23, 1944 3 Sheets-Sheet 2
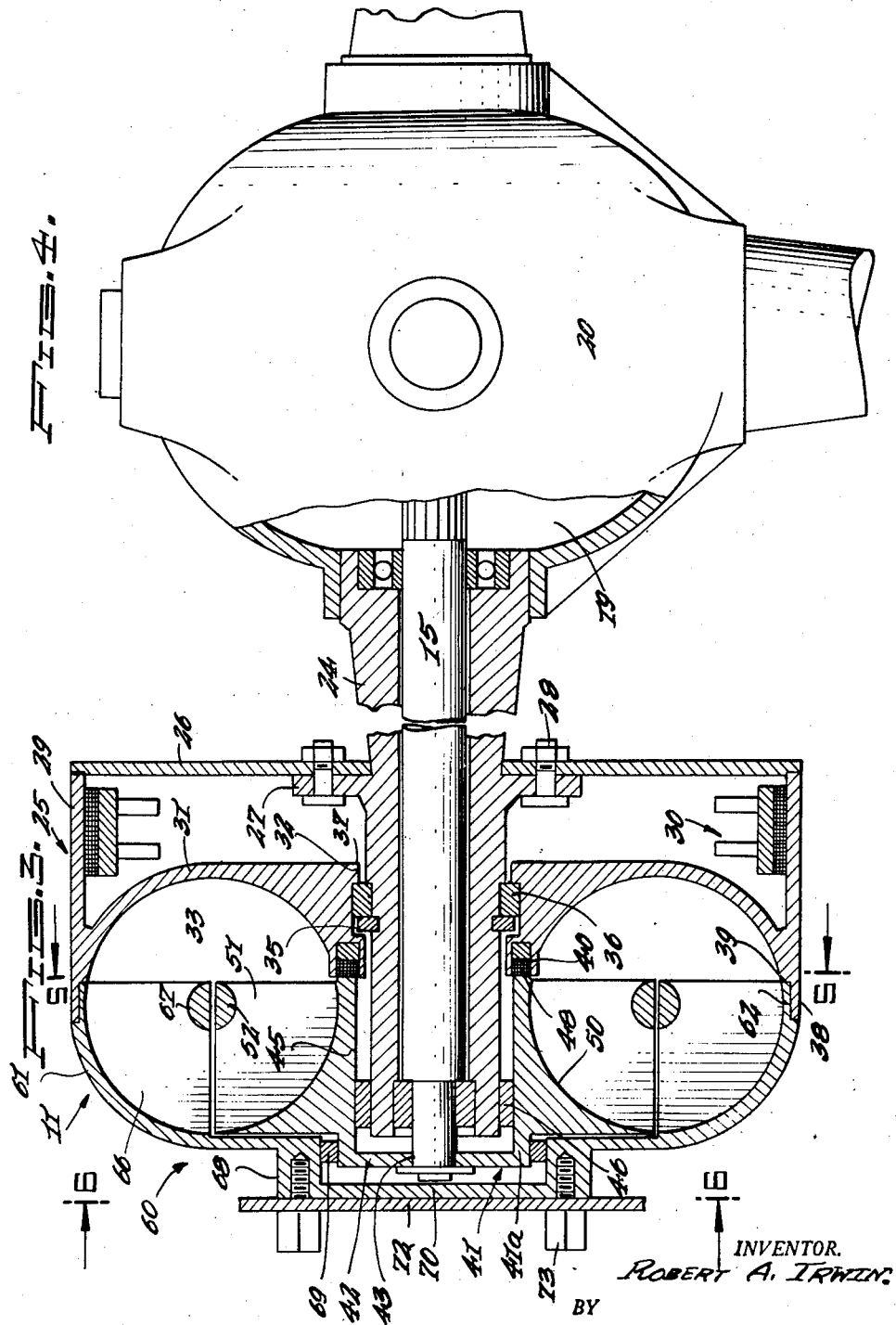
INVENTOR.
ROBERT A. IRWIN.
BY
Carl Miller
ATTORNEY.

May 18, 1948.  R. A. IRWIN  2,441,703
HYDRAULIC TRANSMISSION MECHANISM FOR VEHICLE DRIVE AXLES
Filed March 23, 1944  3 Sheets-Sheet 3
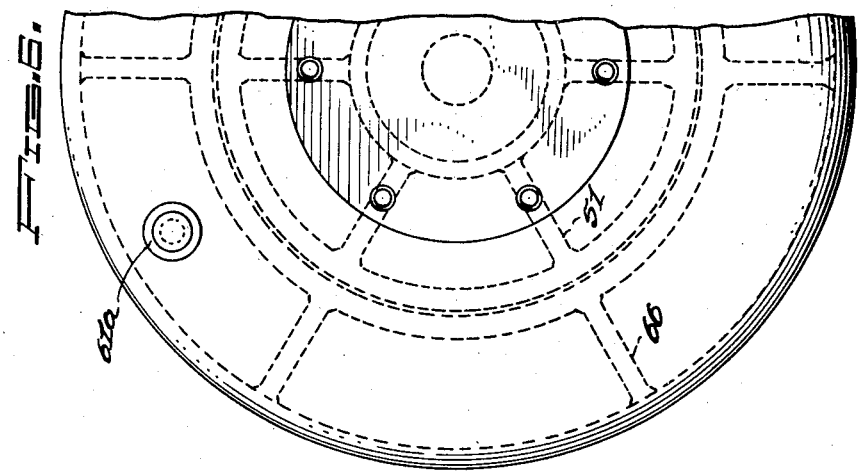
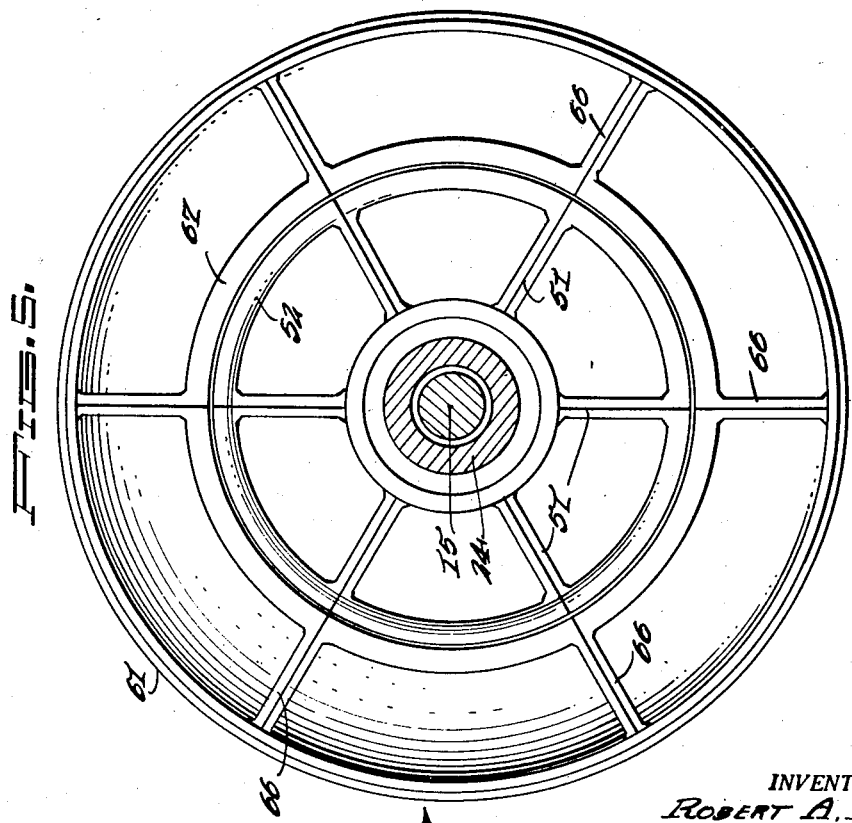
INVENTOR.
ROBERT A. IRWIN.
BY
Carl Miller
ATTORNEY.

Patented May 18, 1948

2,441,703

UNITED STATES PATENT OFFICE 2,441,703

HYDRAULIC TRANSMISSION MECHANISM FOR VEHICLE DRIVE AXLES

Robert A. Irwin, Erie, Pa.

Application March 23, 1944, Serial No. 527,729

2 Claims. (Cl. 180—75)

This invention relates to power transmission and reduction mechanism.

An object of this invention is to provide a mechanism of the character described which may be used with any type of motor where it becomes necessary to increase the speed gradually without stalling or burning out the motor or without using the clutch.

Another object of this invention is to provide a mechanism using centrifugal force and oil to its greatest advantage.

Yet a further object of this invention is to provide a mechanism of the character described having the following advantages:

1. When incorporated into a motor, vehicle or other drive, no transmission is used.
2. No differential of the conventional type is needed.
3. It combines fluid drive and brake drum into a single unit.
4. Forward and reverse shifting takes place in the differential by the use of bevelled gears and jaw clutches.
5. The mechanism may be used on motor vehicles having front wheel or four wheel drive units.
6. The mechanism may be used on any type of motor mounting, for example, in vehicles where the motor is mounted in front, on the side, and in the rear.
7. The improved mechanism insures an even and steady start.
8. This mechanism reduces the use of the clutch considerably.
9. Vehicles in which the mechanism is employed are less likely to skid in winter on icy or slippery pavement.
10. The mechanism reduces tire wear of the vehicle.
11. The mechanism reduces the chance of stalling the power plant due to sudden strain, jerks or loads.
12. The horsepower of the motor need not be so great due to the fact that the mechanism increases the load upon the motor gradually.
13. The mechanism increases the life of the power plant due to production of even load.
14. The construction provides a very easy unit to service.
15. The mechanism may be used with any type of power plant, electric, steam, Diesel, or gasoline.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a top plan view of the chassis of a car showing the mechanism embodying the invention attached to the rear wheels;

Fig. 2 is a cross-sectional view taken on line 2—2 of Fig. 1;

Fig. 3 is a cross-sectional view taken on line 3—3 of Fig. 2;

Fig. 4 is a partial sectional view through the differential;

Fig. 5 is a cross-sectional view taken on line 5—5 of Fig. 3;

Fig. 6 is a cross-sectional view taken on line 6—6 of Fig. 3.

Referring now in detail to the drawing, 10 designates the chassis of a vehicle provided with a pair of oil drive devices or mechanism or power transmission mechanism. The chassis 10 comprises a frame 12 provided with a front axle 13 and a rear axle 15. The vehicle is provided with an engine 16 at its forward end. Extending from the engine is a usual drive rod within a casing 17. The drive rod (not shown) is connected in the usual way to a differential 19 within a differential housing 20. The differential drives the rear axles 15 which are connected to the transmission mechanisms 11 at the sides of the vehicle.

Only one of said mechanisms will be described as they are both the same. Axle 15 is housed within the rear axle housing 24. Attached to the rear axle housing is a disc 26. Said disc 26 has a central opening through which the housing 24 passes. Said disc 26 is bolted to flanges 27 on the housing 24 by means of bolts 28. Rotatably mounted on the axle housing 24 is a casing 25 comprising a cylindrical wall 29 within which is a brake 30. Integrally formed with cylindrical wall 29 is a diffusion chamber 31 formed with a central opening 32 through which the axle housing passes. Diffusion chamber 31 has an annular compartment space in the form of groove 33 of semi-annular cross-section.

On axle housing 24 is an annular stop ring 35 contacting a ring 36 likewise surrounding the axle housing and engaging an annular flange 37 on said chamber. At the outer rim of the chamber is a reduced flange 38 forming an internal shoulder 39. At the inner rim of said chamber is a packing 40.

Fixed to the axle 15 and rotatably mounted on the axle housing 24 is a driving part or member 41. Said driving part has a web 42 formed with an opening 43 through which the axle passes, and the axle may be fixed to the web in any suitable manner.

Member 41 furthermore is formed with an inner cylindrical surface 45 surrounding and spaced from the axle housing. Interposed between the housing and said surface 45 is a bushing 46. The inner end of cylindrical surface 45 contacts the packing 40 as at 48. Said member 41 is further formed with an annular external groove 50 of quadrangular shape. Fixed to said surface 50 are a plurality of radial veins 51 each having the shape of substantially a quarter of a circle. The forward edges of the vanes 51 project into the diffusion chamber 31. The vanes are interconnected by an annular ring 52.

Rotatably mounted on member 41 is a driven part 60 comprising a casing 61 complementary to the casing or chamber 31 and having a flange 62 to receive the flange 38. Casing 61 is fixed to casing 25 by means of screws or bolts to lock said casings together at the flanges 38, 62. The member 60 is provided with integral vanes 66, each having the shape of substantially a quarter of a circle and adapted to rotate about vanes 51. The vanes 66 are interconnected by an annular ring 67. It will be noted that member 60 surrounds member 41 and rotates thereabout.

Member 61 may have a cylindrical wall 68 journalled on a cylindrical wall 41a of member 41, a bushing being interposed between said walls. The rear wall or web 70 of member 61 may be attached to a portion 72 of a rear wheel as by screws 73.

The entire unit 11 may be filled with oil disposed within the space 33 and within members 41 and 60. When the axle 15 rotates, it rotates the rotor or driving part 41 and the oil churns in the diffusion chamber 33 and causes rotation of the driven part 60 which is connected to the wheels for driving the vehicle. Wall 61 may be provided with an oil filling plug 61a if desired as illustrated in Fig. 6 of the drawing.

The principle of the mechanism is the use of centrifugal force and oil to cause the drive. The driving part 41 is in effect a pump with vanes which are connected to the axle or central shaft. The driving part creates a centrifugal force which causes the driven part to rotate in like manner increasing its speed gradually. The diffusion chamber 31 turns the driven part to increase its speed gradually.

As various possible embodiments might be made of the above invention, and as various changes might be made in the embodiment above set forth, it is to be understood that all matter herein set forth or shown in the accompanying drawing is to be interpreted as illustrative and not a limiting sense.

Having thus described my invention, I claim as new and desire to secure by Letters Patent:

1. In combination with the driving axle of a motor vehicle, a hydraulic drive mechanism comprising a hub surrounding said axle, a casing mounted on said hub having a semi-circular shaped, annular groove portion, inner driving and outer driven mated casings having annular arcuate shaped portions, the groove in said first mentioned casing and the arcuate shaped portions in said mated casings forming a closed circular annular chamber, spaced radially extending vanes in the arcuate shaped portions of said mated casings, means on said outer driven mated casing for mounting a vehicle wheel, means for mounting said inner mated casing on said hub, fluid in the closed circular annular chamber formed by said casings, means for transferring rotative force from said axle to said driving mated casing and means for connecting said first mentioned casing and said driven mated casing.

2. A hydraulic drive mechanism as set forth in claim 1 wherein braking means are provided for said driven mated casing and said first mentioned casing.

ROBERT A. IRWIN.

REFERENCES CITED

The following references are of record in the file of this patent:

UNITED STATES PATENTS

| Number | Name | Date |
|---|---|---|
| 1,275,344 | White | Aug. 13, 1918 |
| 1,730,900 | Rockwell | Oct. 8, 1929 |
| 2,004,279 | Föttinger | June 11, 1935 |
| 2,078,597 | Beaumont | Apr. 27, 1937 |
| 2,221,705 | Glynn, Jr. | Nov. 12, 1940 |
| 2,287,498 | Scofield | June 23, 1942 |
| 2,335,544 | Schnetzer | Nov. 30, 1943 |
| 2,337,609 | Jamieson | Dec. 28, 1943 |